(12) United States Patent
Sakamura et al.

(10) Patent No.: US 6,485,371 B2
(45) Date of Patent: Nov. 26, 2002

(54) GROOVED NUT AND MANUFACTURING METHOD THEREOF

(75) Inventors: Yoshikazu Sakamura, Kyoto (JP); Fumio Kamiyama, Kyoto (JP)

(73) Assignee: Kabushiki Kaisha Sakamura Kikai Seisakusho (JP)

( * ) Notice: Subject to any disclaimer, the term of this patent is extended or adjusted under 35 U.S.C. 154(b) by 108 days.

(21) Appl. No.: 09/752,690

(22) Filed: Jan. 3, 2001

(65) Prior Publication Data

US 2002/0054806 A1 May 9, 2002

(30) Foreign Application Priority Data

Nov. 6, 2000 (JP) .......................... 2000-336971

(51) Int. Cl.[7] .................. B21D 53/24; B21H 3/08; B21K 1/44
(52) U.S. Cl. ................ 470/26; 470/25; 470/18; 72/357
(58) Field of Search ............... 470/18, 20, 21, 470/25, 26, 89, 91; 72/353.2, 357, 358

(56) References Cited

U.S. PATENT DOCUMENTS

| | | | | | |
|---|---|---|---|---|---|
| 1,946,618 A | * | 2/1934 | Fitch et al. | .................. | 470/25 |
| 2,501,040 A | * | 3/1950 | Gade | .................. | 470/25 |
| 4,468,827 A | * | 9/1984 | Shachaf | .................. | 72/357 |
| 4,654,913 A | * | 4/1987 | Grube | .................. | 470/18 |

FOREIGN PATENT DOCUMENTS

JP  2000-15527  1/2000

* cited by examiner

Primary Examiner—Ed Tolan
(74) Attorney, Agent, or Firm—Barnes & Thornburg (57) ABSTRACT

A grooved nut including a cylindrical shaft portion having a screw hole at the center, a head portion whose outer periphery is polygonal and which is provided at one end portion of the shaft portion, and a peripheral groove provided at a boundary part between the head portion and the shaft portion, in which the peripheral groove is formed by a plasticizing process.

3 Claims, 9 Drawing Sheets

GROOVED NUT AND MANUFACTURING METHOD THEREOF

BACKGROUND OF THE INVENTION

1. Field of the Invention

The present invention relates to a grooved nut secured to a variety of members to fasten a bolt and the like and relates to a fastening technique.

2. Description of the Related Art

Known as a nut to be attached to metal plates forming various kinds of devices and apparatuses is, for example, such a calking nut device as disclosed in Japanese Patent Laying-Open No. 2000-15527. The device is designed to thrust a nut by force from above into a lower hole of a metal plate disposed on a die to increase a diameter of its distal end portion, thereby attaching the nut to the metal plate.

Another well-known grooved nut is that called self-clinching nut for use in attaching a nut to a relatively flexible material such as an aluminum plate.

The grooved nut is formed to have a cylindrical shaft portion having a screw hole at its center, a head portion whose outer periphery is polygonal and which is provided at one end portion of the shaft portion, and a peripheral groove provided at a boundary part between the head portion and the shaft portion, so that with the shaft portion inserted into an attachment hole provided in advance at such a member as an aluminum plate to which attachment is made, thrusting the head portion into the member to which attachment is made by pressing or the like results in plastic deformation of the member to which attachment is made caused by the thrusting of the head portion to make a mass of the member in question to flow into the peripheral groove, thereby securing the whole nut in question to the member to which attachment is made with the nut whirl-stopped by the thrusting of the polygonal head portion by force.

Using the present grooved nut more facilitates its attachment work than that by welding or the like to improve productivity of the device or apparatus in question.

Conventional grooved nuts, however, have the following shortcomings because they are formed by cutting out a bar member whose sectional configuration is polygonal to correspond to the configuration of a head portion of the nut into a predetermined size and then forming a shaft portion and a peripheral groove by a cutting process.

More specifically, when the peripheral groove is formed by the cutting process, a fiber flow of the material is cut off at the peripheral groove portion. On the other hand, the peripheral groove portion is a part smaller in diameter than other portions and smaller in thickness of a mass when it is hollow, and also a part on which stress is liable to concentrate, so that the peripheral groove portion is liable to lack a strength and break.

In addition, since the width of the peripheral groove is narrow, a tool for forming the groove by the cutting process should have a narrow tip, whereby the tool is liable to break, be damaged or abrade to cause reduction in working efficiency or increase in costs.

SUMMARY OF THE INVENTION

Consequently, it is an object of the present invention to provide a grooved nut having a peripheral groove portion whose strength is high enough and which causes none of breakage, damage or the like of a tool at the manufacturing.

According to one aspect, the present invention relates to a grooved nut which has a cylindrical shaft portion having a screw hole at its center, a head portion whose outer periphery is polygonal and which is provided at one end portion of the shaft portion, and a peripheral groove provided at a boundary part between the head portion and the shaft portion, in which the peripheral groove is formed by a plasticizing process.

According to the grooved nut, since fiber flow of a material will not be cut off in the vicinity of the peripheral groove, a desired strength is ensured even when the thickness or the diameter of the groove portion is smaller than that of other portions.

According to another aspect, the present invention relates to a method of manufacturing a grooved nut which has a cylindrical shaft portion having a screw hole at its center, a head portion whose outer periphery is polygonal and which is provided at one end portion of the shaft portion, and a peripheral groove provided at a boundary part between the head portion and the shaft portion, in which the head portion at the tip and the peripheral groove continuous thereto are formed by decreasing the diameter of one end portion of the cylindrical material having a lower hole of the screw hole provided at its center by a pressing process to make its major diameter smaller than those of the other portions, as well as increasing the distal end side of the smaller diameter portion by a pressing process while constraining the proximal end thereof by using a split mold.

According to the present invention, a grooved nut in which no fiber flow is cut off at the peripheral portion according to one aspect of the present invention is manufactured, while the need of a tool having a narrow tip for forming the peripheral groove is eliminated to prevent break, damage or early abrasion of tools.

According to a further aspect, the present invention is characterized in that at the formation of the head portion by the pressing process in the above-described invention according to another aspect, the outer peripheral of the head portion is formed to be polygonal. Moreover, according to a still further aspect, the present invention is characterized in that also in the above-described invention according to another aspect, after the head portion is formed by the pressing process, the outer peripheral portion of the head portion is formed to be polygonal by trimming.

Of these inventions, the invention according to the further aspect eliminates the need of other steps of forming the head portion into a polygonal configuration when the polygonal configuration of the head portion is relatively simple configuration such as pentagon.

In addition, the invention according to the still further aspect enables formation of the head portion to high precision even when its polygonal configuration is relatively complicated such as serration or gear form.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

In the following, embodiments of the present invention will be described.

Figure 1:
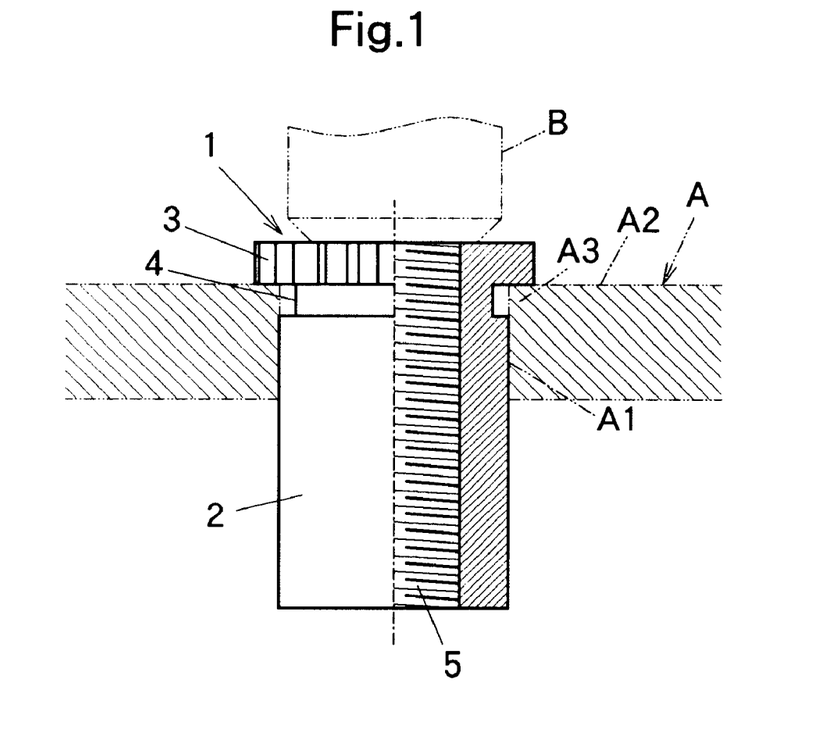
FIG. 1 is a half cross-sectional front view of a grooved nut according to an embodiment of the present invention.
Figure 2:
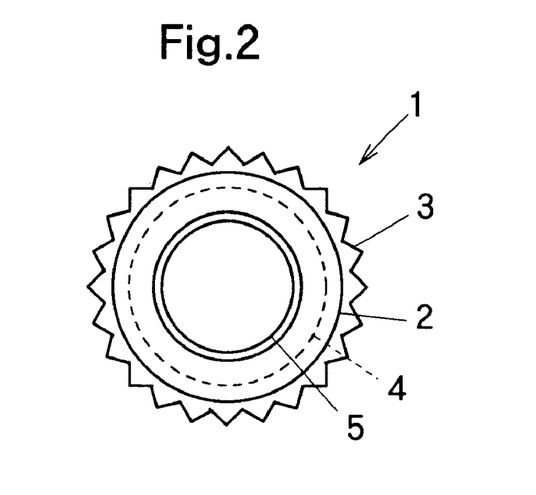
FIG. 2 is a bottom view of the grooved nut.

First, description will be made of an embodiment of a grooved nut. As shown in FIGS. 1 and 2, a grooved nut 1 is provided with a cylindrical shaft portion 2, a head portion 3 which is provided at the one end portion of the shaft portion 2 and whose outer periphery is of serration, and a peripheral grooved provided at a boundary between the shaft portion 2 and the head portion 3, and also provided, at the center, with a screw hole 5 piercing through in the forging direction. The above-described head portion 3 may be of, in addition to serration, other polygonal shape such as a gear or pentagonal shape.

Then, at the grooved nut 1, the above-described peripheral groove 4 is formed not by a cutting process but by a plasticizing process such as pressing or forging.

Figure 3:
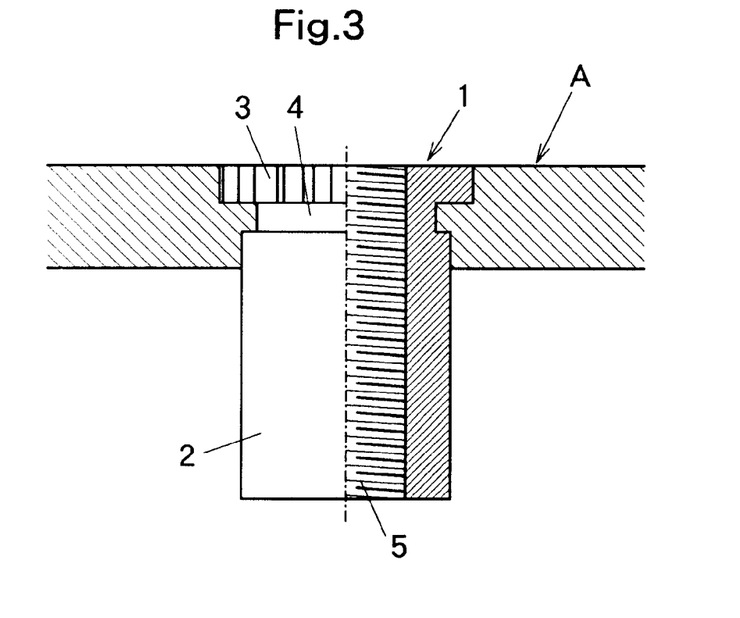
FIG. 3 is a half cross-sectional front view showing a state of use of the grooved nut.

An example of use of the grooved nut 1 will be described. As indicated by the chain line in FIG. 1, at a member A to which attachment is made such as an aluminum plate, form a hole A1 having a diameter corresponding to the shaft portion 2 of the nut 1 in advance, and insert the shaft portion 2 of the nut 1 into the hole A1. Then, by a press B or the like, thrust the head portion 3 of the nut 1 into one surface A2 of the member A to which attachment is made. At this time, a mass portion A3 around the hole on the surface A2 of the member A to which attachment is made is plastically deformed by the pressing of the head portion 3 of the nut 1, so that it flows into the peripheral groove 4 between the shaft portion 2 and the head portion 3 of the nut 1. As a result, with the nut 1 whirl-stopped by the polygonal head portion 3, the nut 1 will be secured at the member A to which attachment is made.

Then, in a case of this grooved nut 1, in particular, since the peripheral groove 4 is formed not by a cutting process but by a plasticizing process such as pressing or forging, no cut-off of a material fiber flow occurs in the peripheral groove portion, so that a desired strength is ensured even when the thickness or the diameter of the portion is smaller than those of other portions, causing no breakage due to concentration of stress etc.

Figure 4:
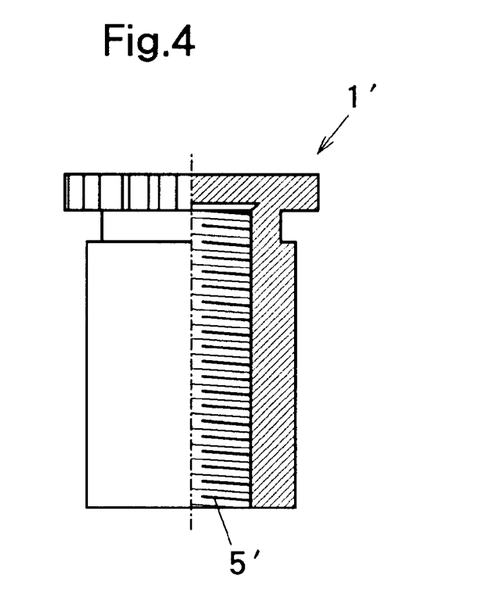
FIG. 4 is a half cross-sectional front view showing a groove nut according to another embodiment of the present invention.

Although in the grooved nut 1 according to above-described embodiment, the screw hole 5 at the center pierces through, it may not pierce through in some cases such as a screw hole 5' in a grooved nut 1' illustrated in FIG. 4.

Next, description will be made of an embodiment of a grooved nut manufacturing method.

Figure 5:
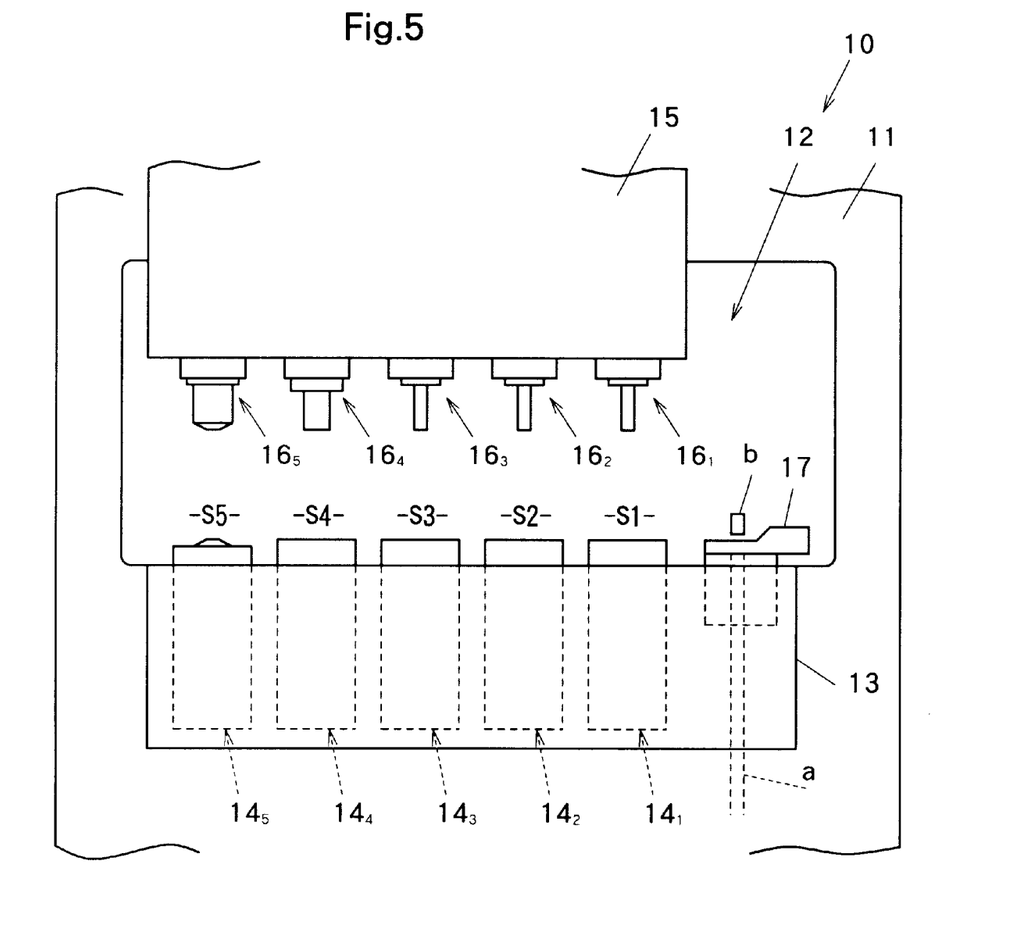
FIG. 5 is a schematic plan view of a multi-stage forging apparatus for use in a method of manufacturing a grooved nut according to the embodiment of the present invention.

FIG. 5 is a plan view showing a schematic structure of a multi-stage forging apparatus for use in this embodiment. In this forging apparatus 10, on one side of a working space 12 disposed at the center of a main body 11, a die block 13 is provided in which a plurality of die units 141 to 145 are disposed, while on the opposite side, a ram 15 moving toward and away from the die block 13 is provided in which ram a plurality of punch units 161 to 165 are disposed opposing to the die units 141 to 145, respectively, so that the respective die units 141 to 145 and the punch units 161 to 165 opposing to each other constitute a plurality of stages (five stages in the illustrated example) of forging stations S1 to S5.

Then, at one end of the die block 13, a cutter device 17 is provided for cutting a wire rod "a" into a predetermined size to form a workpiece "b". Then, the workpiece "b" is sequentially supplied to the forging stations S1 to S5 and subjected to a predetermined process, whereby such a grooved nut is formed as illustrated in FIGS. 1 and 2.

Next, more detailed description will be made of a fourth forging station S4 constituting a characteristic part of the present invention among the respective stations of the forging apparatus 10.

Figure 6:
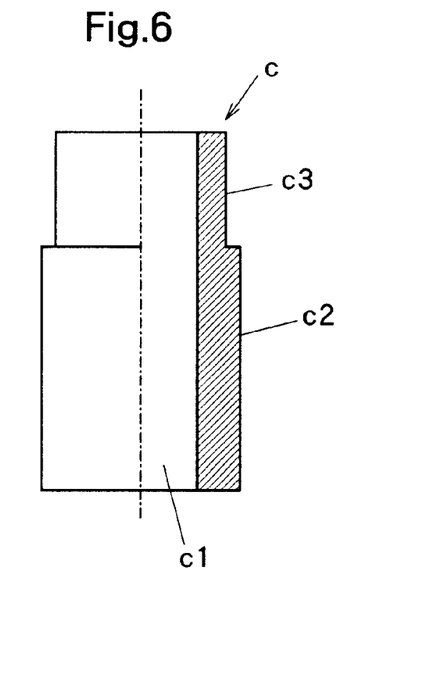
FIG. 6 is a half cross-sectional front view of an intermediate product formed at a preceding stage of the present manufacturing method.

An intermediate product "c" supplied to the fourth forging station S4 is formed by reducing a diameter of one end portion of a cylindrical workpiece c2 in which a lower hole c1 of a screw hole is provided at the center by a pressing process to have a small diameter portion c3 as illustrated in FIG. 6.

Figure 7:
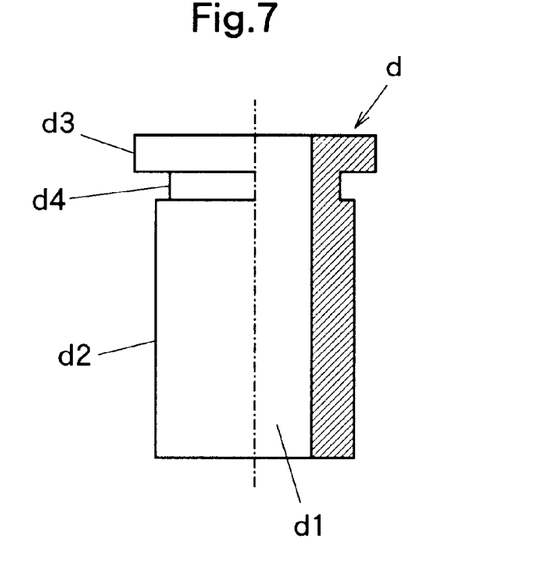
FIG. 7 is a half cross-sectional front view of a quasi-finish product formed by the present manufacturing method.

Then, the fourth forging station S4 forms, out of the intermediate product "c", a quasi-finish product "d" having a lower hole d1 of the screw hole provided at the center, a round head portion d3 provided at one end of a shaft portion d2 and a peripheral groove d4 provided at the boundary between the shaft portion :d2 and the head portion d3 as shown in FIG. 7.

Figure 8:
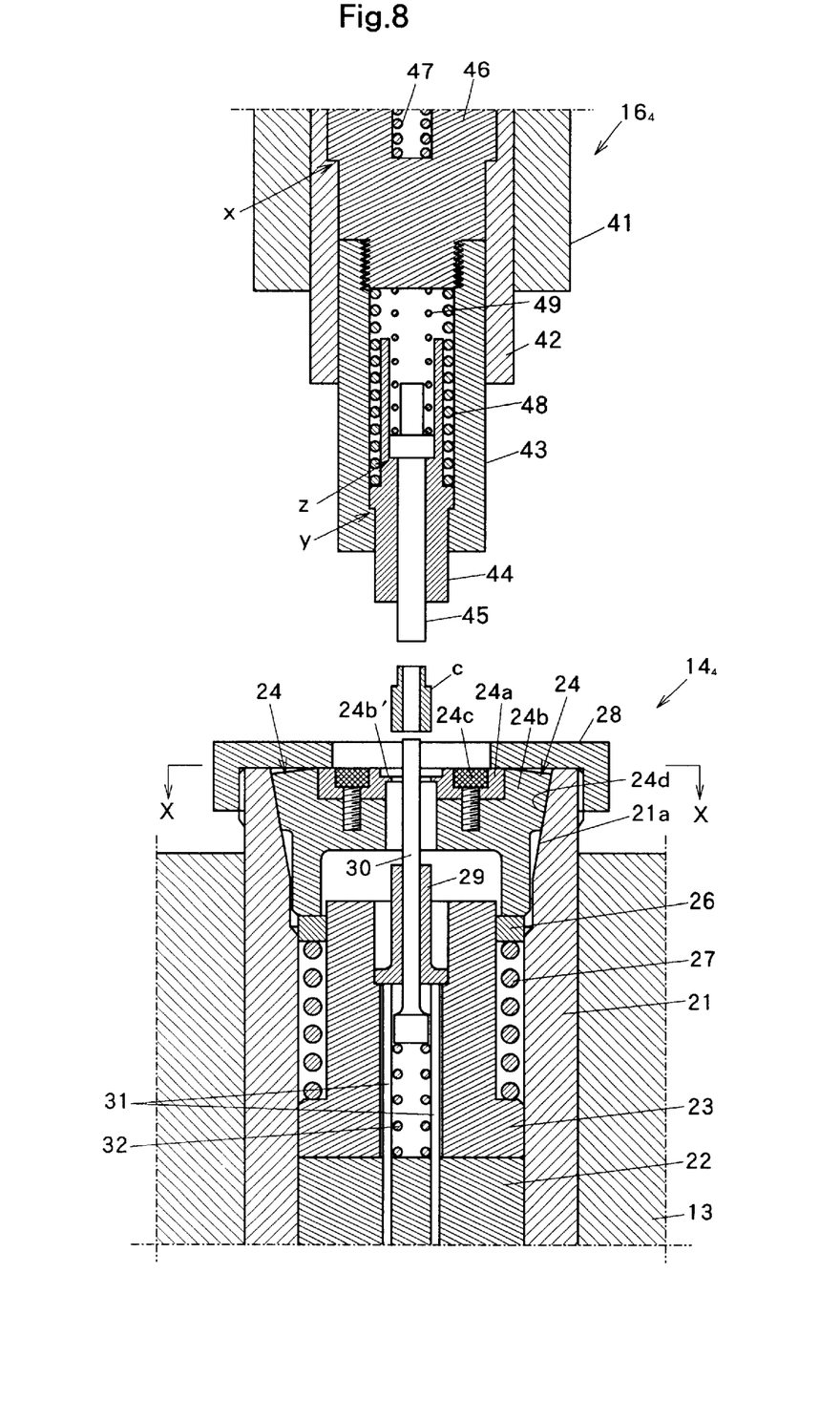
FIG. 8 is a sectional view showing a structure of a station of the forging apparatus illustrated in FIG. 5 which executes the method according to the present invention.

As illustrated in FIG. 8, the die unit 144 constituting the fourth forging station S4 has a die case 21 fit in the die block 13. In the rear of the die case 21, a spacer 22 is accommodated and at the fore side thereof, a load-receiving member 23 is accommodated, while at the fore part of the die case 21, four split dies 24 . . . 24 are accommodated.

Figure 9:
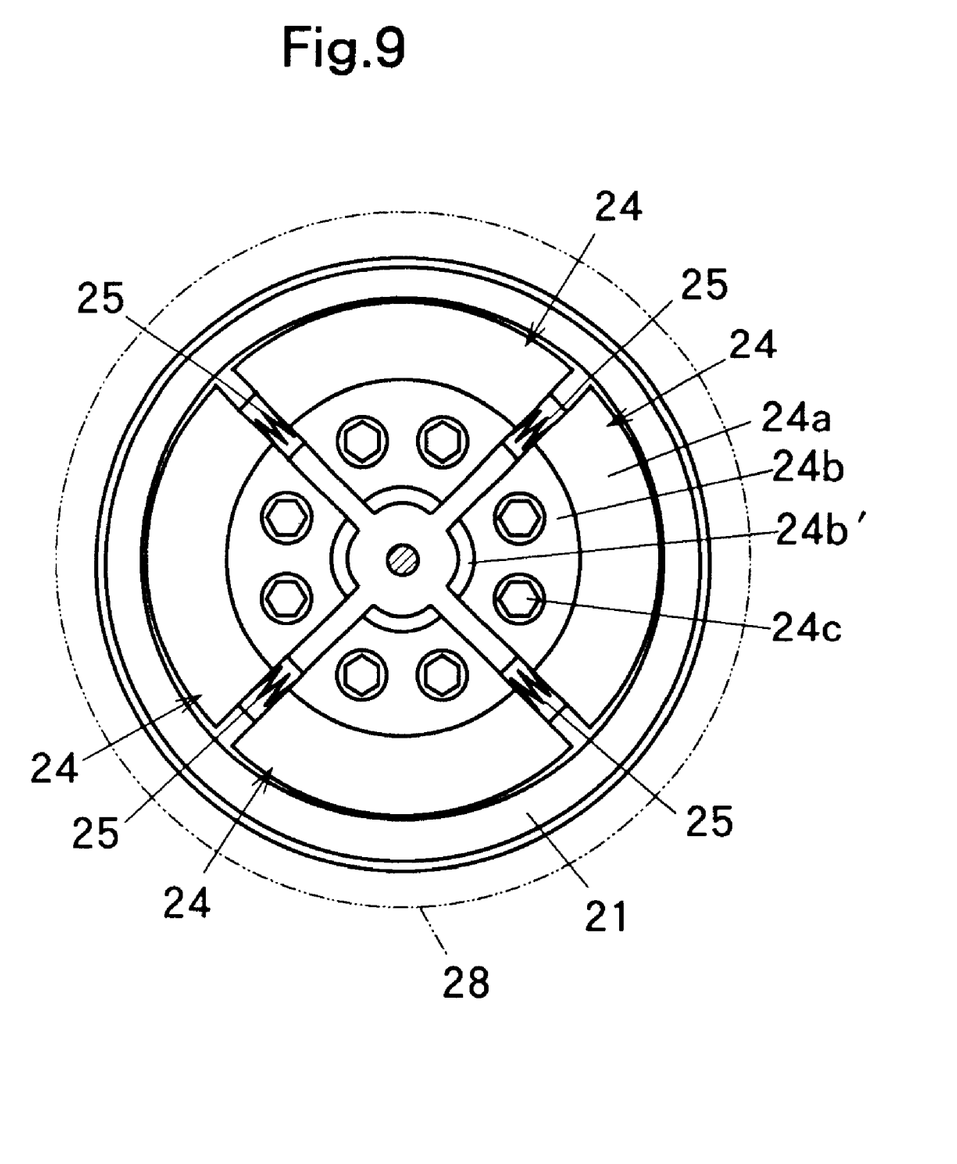
FIG. 9 is a front view of a split die constituting the station seen from the X—X direction in FIG. 8.

These split. die 24 . . . 24 is structured to have a die main body 24b attached to a die holder 24a by using bolts 24c, 24c and to be fan-formed having a center angle of 90 degrees such that four quartered pieces form a round as shown in FIG. 9. Then, the dies are designed such that with four quartered pieces congregate, inner surfaces of the respective split dies 24 . . . 24 form a cavity corresponding to an outer configuration of the quasi-finish product "d" illustrated in FIG. 7. In particular, provided on the inner surface of each die main body 24b is a protruding portion 24b' inwardly protruding in order to form the peripheral groove of the quasi-finish product.

In addition, between split faces of the split dies 24 . . . 24 opposing to each other, a spring 25 . . . 25 is provided for moving these faces away from each other to increase the diameter as a whole.

Then, as shown in FIG. 8, the outer peripheral surface 24d . . . 24d of each split die 24 . . . 24 is formed such that when the four surfaces congregate, they constitute a conical surface whose diameter is decreased toward the bottom and also the inner surface 21a of the fore part of the die case 21 in which these split dies 24 . . . 24 are housed is formed to be a similar conical surface.

In addition, between a ring member 26 arranged at the rear of the respective split dies 24 . . . 24 and the load receiving member 23, a spring 27 for pushing the respective split dies 24 . . . 24 forward is provided, while to the front end portion of the die case 21, a cover member 28 is attached whose center is opened in order to prevent the split dies 24 . . . 24 from pushing forward by the spring 27.

Furthermore, arranged at the center of the front-end portion of the load-receiving member 23 is a sleeve member 29 into which a pin member 30 plunges.

The front end portion of the sleeve member 29 is provided such that it plunges into a cavity formed by the split dies 24 . . . 24 to form the end surface of the dies 24 when the split dies 24 . . . 24 are thrust into inside against the biasing force of the spring 27, and in addition, at the back of the sleeve member 29, a plurality of eject pins 31 . . . 31 are arranged such that the sleeve member 29 is pushed forward through the eject pins 31 . . . 31 after forging operation to eject a forged product in the cavity forward.

The pin member 30 is forced forward by a spring 32 provided between the rear end portion of the pin member and the spacer member 22 such that the front end portion of the same is projected forward through the cavity formed by the split dies 24 . . . 24.

On the other hand, the punch unit 164 constituting the fourth forging station S4 has a punch case 42 fixed to the ram through a punch holder 41, in which punch case 42, a cylindrical external punch 43, a cylindrical intermediate punch 44 and a shaft-shaped internal punch 45 are triply held with their distal end portions projecting forward in order.

Of these punches, the external punch 43 is secured to an attachment member 46 and housed in the punch case 42 to be slidable in the forging direction, as well as being forced by a spring 47 so as to project forward (to the side of the die clock 13) until at a staged portion x provided at a part where the attachment member 46 and the punch case 42 fit in, staged surfaces of the two come into contact with each other.

The intermediate punch 44 is fit in the external punch 43 to be slidable in the forging direction, as well as being forced by a spring 48 so as to project forward until at a staged portion y provided at the fit in portion, staged surfaces of the punches come into contact with each other.

The internal punch 45 is fit in the internal punch 44 to be slidable in the forging direction, as well as being forced by a spring 49 so as to project forward until at a staged portion z provided at the fit-in portion, staged surfaces of the two punches come into contact with each other similarly to the above-described respective punches.

Next, description will be made of a process of forging the intermediate product c shown in FIG. 6 into the quasi-finish product d shown in FIG. 7 by the fourth forging station S4.

As shown in FIG. 8, with the intermediate product c supplied to the front of the die unit 144 of the fourth forging station S4 by a material supply device (not shown), when the ram 15 moves forward, first the distal end portion of the internal punch 45 projecting most forward in the punch unit 164 thrusts the intermediate product c toward the die unit 144, so that, the intermediate product c is inserted into the distal end portion of the pin member 30 located at the center of the four split dies 24 . . . 24 in the die unit 144.

Figure 10:
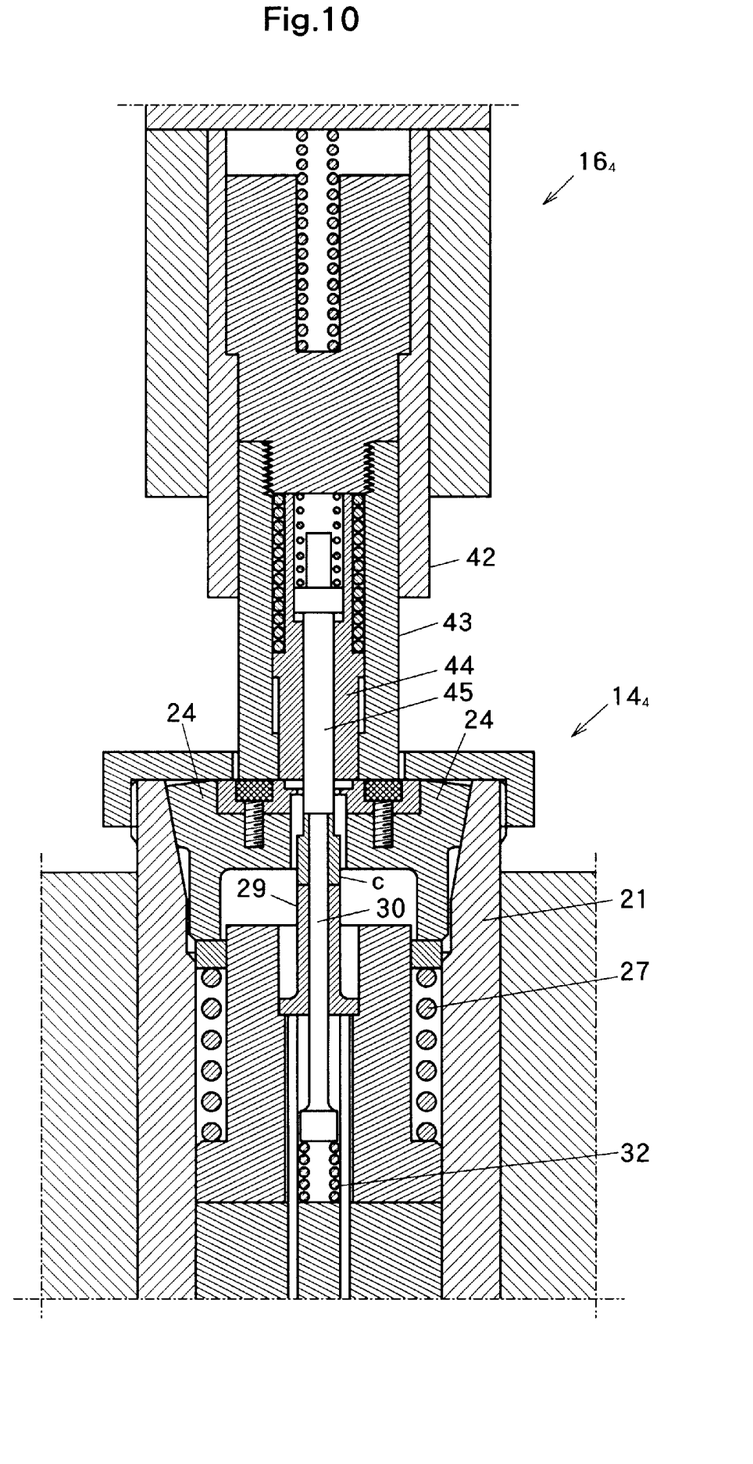
FIG. 10 is a sectional view showing a state of the station before pressing.

In addition, when the ram 15 moves forward further, the tip of the internal punch 45, while thrusting the pin member 30 backward against the spring 32, thrusts the intermediate product c inserted into the pin member 30 until the rear end portion of the product comes into contact with the front end portion of the sleeve member 29 as illustrated in FIG. 10. At this time, the intermediate punch 44 and the external punch 43 sequentially come into contact with front-end surfaces of the split dies 24 . . . 24.

Figure 11:
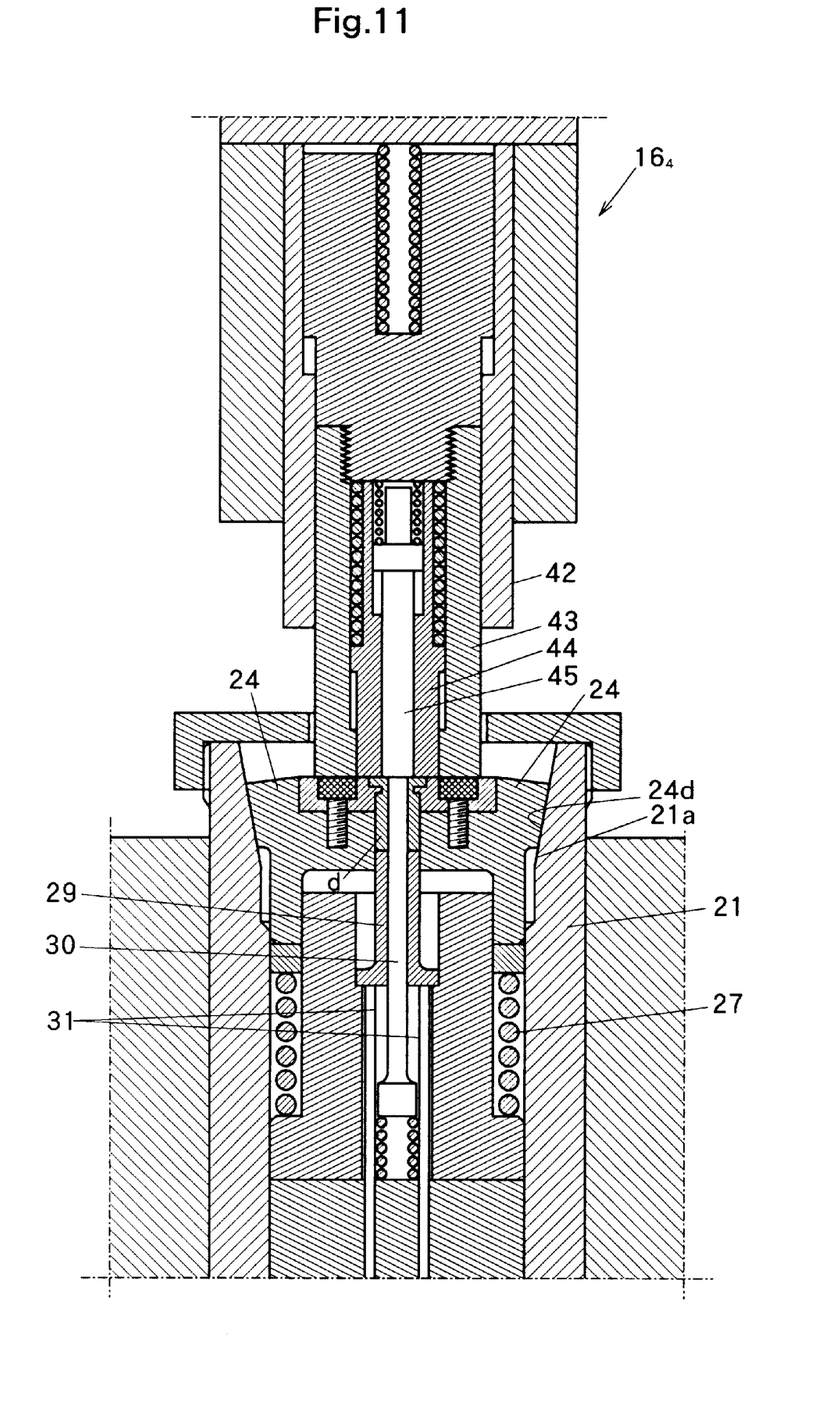
FIG. 11 is a sectional view showing a state of the same immediately after pressing.

Then, at this state, when the ram 15 moves forward further, the intermediate punch 44 and the external punch 43, moving relatively backward within the punch case 42, move forward as a whole to thrust the split dies 24 . . . 24 into the inside of the die case 21 against the biasing force of the spring 27 as illustrated in FIG. 11.

Since the outer peripheral surface 24d of each split dies 24 . . . 24 is made such that when they congregate, they constitute a conical surface whose diameter is decreased toward the bottom and an inner peripheral surface 21a of the front end portion of the die case 21 in which these split dies 24 . . . 24 are housed is also formed to be a similar conical surface, the split dies 24 . . . 24 at this time are guided by the conical surface 21a of the die case 21 to come closer to each other against the biasing force of the spring 25 shown in FIG. 9 and congregate as a whole.

As a result, the outer peripheral surface of the intermediate product c inserted into the pin member 30 is squeezed by the inner surface of each split die 24 . . . 24 into a shape of a cavity formed by the split dies 24 . . . 24, resulting in manufacturing the quasi-finish product d having the shaft portion d2, the head portion d3 and the peripheral groove d4 as illustrated in FIG. 7.

In this case, since the head portion d3 and the peripheral groove d4 are formed by increasing the diameter of the distal end of the small diameter portion c3 of the intermediate product c while constraining the proximal end of the portion c3 by the projections 24b' . . . 24b' provided on the inner surfaces of the split dies 24 . . . 24, no fiber flow of the workpiece is cut off in the range from the shaft portion d2 through the peripheral groove d4 to the head portion d3.

Then, upon manufacturing of the above-described quasi-finish product d within the cavity, the punch unit 164 withdraws from the side of the die block 13 together with the ram 15, so that the split dies 24 . . . 24 in the die case 21 are pushed forward by the spring 27 and separated from each other by the springs 25 . . . 25 shown in FIG. 9 to have the diameter increased as a whole to release the quasi-finish product d. Thereafter, the eject pins 31 . . . 31 move forward to eject the quasi-finish product d out of the die case 21 through the sleeve member 29.

Thus, the quasi-finish product d of a grooved nut shown in FIG. 7 is formed whose head portion will be trimmed into serration at the fifth station S5. Thereafter, an internal thread is formed in the central lower hole d1 outside the forging apparatus 10, resulting in forming the grooved nut 1 as the finish product shown in FIGS. 1 and 2.

When the head portion has a relatively simple configuration such as a pentagonal shape etc., it is possible to forge the product into such a shape at the fourth forging station S4 when increasing the diameter of the head portion.

Figure 12:
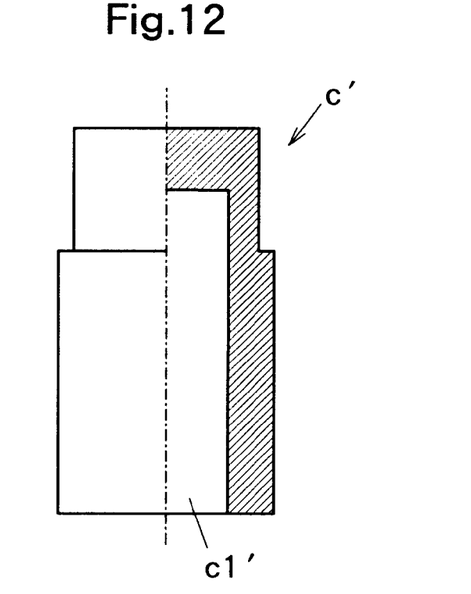
FIG. 12 is a half cross-sectional front view of an intermediate product corresponding to the grooved nut shown in FIG. 4.
Figure 13:
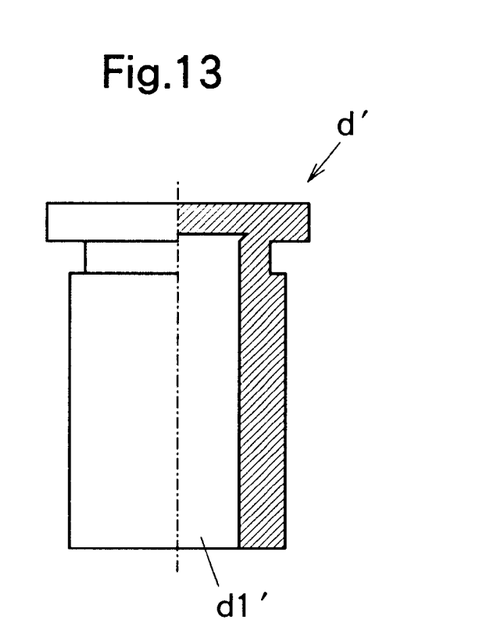
FIG. 13 is a half cross-sectional front view of a quasi-finish product corresponding to the grooved nut of FIG. 4.

In addition, when manufacturing the nut 1' having the central screw hole 5' shown in FIG. 4 which is designed not to pierce through, lower holes c1' and d1' of the screw holes in an intermediate product c' and a quasi-finish product d' will not pierce through as illustrated in FIGS. 12 and 13.

As described in the foregoing, the present invention realizes a grooved nut including a cylindrical shaft portion having a screw hole at the center, a head portion whose outer periphery is polygonal and which is provided at one end portion of the shaft portion and a peripheral groove provided at the boundary portion between the head portion and the shaft portion, in which no fiber flow of a material is cut off at the peripheral groove portion.

Accordingly, since a desired strength is ensured in the grooved nut even when a thickness of the peripheral groove portion is smaller or a diameter of the same is smaller than those of other portions, at the time of attachment of the nut to a member to which attachment is made and during the subsequent use, breakage from the peripheral groove portion due to concentration of stress etc. can be prevented.

In addition, since the need of a cutting tool whose tip is narrow for forming the groove is eliminated, reduction of working efficiency and the like due to breakage and early abrasion of the tool can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a grooved nut which has a cylindrical shaft portion having a screw hole at its center, a head portion whose outer periphery is polygonal and which is provided at one end portion of the shaft portion, and a peripheral groove provided at a boundary part between the head portion and the shaft portion, comprising the steps of:

decreasing the diameter of one end portion of the cylindrical material having a lower hole of the screw hole provided at the center by a pressing process to make the major diameter smaller than diameters of the other portions, and increasing the distal end of the smaller diameter portion by a pressing process while constraining the proximal end of the smaller diameter portion by using a split mold, thereby forming the head portion at the tip and the peripheral groove continuous to the head portion.

2. The grooved nut manufacturing method according to claim 1, wherein at the forging of the head portion by the pressing process the outer periphery of the head portion is forged to be polygonal.

3. The grooved nut manufacturing method according to claim 1, wherein after the head portion is forged by the pressing process, the outer periphery of the head portion is forged to be polygonal by a trimming process.

* * * * *